(12) United States Patent
Pismenny et al.

(10) Patent No.: US 10,938,965 B2
(45) Date of Patent: Mar. 2, 2021

(54) MESSAGE SEGMENTATION

(71) Applicant: MELLANOX TECHNOLOGIES, LTD., Yokneam (IL)

(72) Inventors: Boris Pismenny, Haifa (IL); Liran Liss, Atzmon (IL); Yossi Kuperman, Haifa (IL); Roee Moyal, Yokneam Illit (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 16/442,576

(22) Filed: Jun. 17, 2019

(65) Prior Publication Data

US 2019/0387079 A1 Dec. 19, 2019

Related U.S. Application Data

(60) Provisional application No. 62/686,112, filed on Jun. 18, 2018.

(51) Int. Cl.
*H04L 29/06* (2006.01)
*H04L 29/12* (2006.01)
*H04L 29/08* (2006.01)

(52) U.S. Cl.
CPC .......... *H04L 69/22* (2013.01); *H04L 61/2007* (2013.01); *H04L 69/16* (2013.01); *H04L 69/325* (2013.01); *H04L 61/6063* (2013.01)

(58) Field of Classification Search
CPC ..... H04L 69/22; H04L 61/2007; H04L 69/16; H04L 69/325
See application file for complete search history.

(56) References Cited

U.S. PATENT DOCUMENTS

| 7,415,652 | B1* | 8/2008 | Szeremi | H03M 13/00 |
| 2005/0114549 | A1* | 5/2005 | Durham | G06F 15/16 |
| 2010/0115174 | A1* | 5/2010 | Akyol | G06F 13/00 |
| 2010/0172350 | A1* | 7/2010 | Spencer | H04L 12/56 |
| 2019/0394144 | A1* | 12/2019 | Doree | H04L 12/861 |

OTHER PUBLICATIONS

Iyengar et al., "QUIC: A UDP-Based Multiplexed and Secure Transport draft-ietf-quic-transport-12", Internet-Draft Fastly, Intended status: Standards Track, pp. 1-107, May 22, 2018.

(Continued)

*Primary Examiner* — Ronald B Abelson
(74) *Attorney, Agent, or Firm* — Kligler & Associates Patent Attorneys Ltd

(57) ABSTRACT

A system including a network interface layer, and a physical network connection configured to connect with a networking medium, wherein the network interface layer is configured to: A) receive a user datagram protocol (UDP) message for sending, the UDP message having a length L, and a desired maximum network message size (MSS), B) segment the UDP message in accordance with the MSS into a plurality of message segments, each message segment having a size no greater than MSS, and adjust information in each of the plurality of message segments, and C) send the plurality of message segments via the physical network connection to a networking medium. Related apparatus and methods are also provided.

14 Claims, 4 Drawing Sheets

(56) References Cited

OTHER PUBLICATIONS

Iyengar et al., "QUIC: A UDP-Based Multiplexed and Secure Transport draft-ietf-quic-transport-19", Internet-Draft Fastly, Intended status: Standards Track, pp. 1-139, Mar. 11, 2019.
Wikipedia, "Large receive offload", pp. 1-2, May 3, 2019.
Wikipedia, "QUIC", pp. 1-6, Jun. 12, 2019.
Postel, J., "User Datagram Protocol", request for comments 768, pp. 1-3, Aug. 28, 1980.
Internet Protocol, "Darpa Internet Program", Protocol specification, Information Sciences Institute, Request for comments 791, pp. 1-49, Sep. 1981.
Wikipedia, "User Datagram Protocol", pp. 1-7, May 14, 2019.
The Linux Kernel Archives, "Segmentation Offloads in the Linux Networking Stack", 3 pages, Jun. 16, 2019.
Pismenny, "Net/mlx5e: Add UDP GSO support", The Linux Kernel Archives, pp. 1-4, May 31, 2018.
Miller, "Merge branch udp-gso", The Linux Kernel Archives, pp. 1-27, Apr. 26, 2018.

* cited by examiner ary embodiment of the present invention the networking medium includes an Ethernet networking medium.

MESSAGE SEGMENTATION

PRIORITY CLAIM

The present application claims priority from U.S. Provisional Patent Application 62/686,112 of Pismenny et al, filed 18 Jun. 2018 and entitled UDP Segmentation Offload.

FIELD OF THE INVENTION

The present invention relates to segmentation of messages in general, and particularly but not exclusively to segmentation of messages when using the user datagram protocol (UDP).

BACKGROUND OF THE INVENTION

The UDP protocol is defined in RFC768. Generally the UDP protocol runs over IP. The UDP protocol is intended to provide users with a mechanism to send messages with minimal application overhead. A UDP message is limited to 64 kB due to the size of the UDP header's length field, which can represent a length up to 64 kB.

SUMMARY OF THE INVENTION

The present invention, in certain embodiments thereof, seeks to provide an improved system for sending messages, particularly using the UDP protocol, implementing message segmentation.

There is thus provided in accordance with an exemplary embodiment of the present invention a system including a network interface layer, and a physical network connection configured to connect with a networking medium, wherein the network interface layer is configured to: A) receive a user datagram protocol (UDP) message for sending, the UDP message having a length L, and a desired maximum network message size (MSS), B) segment the UDP message in accordance with the MSS into a plurality of message segments, each message segment having a size no greater than MSS, and adjust information in each of the plurality of message segments, and C) send the plurality of message segments via the physical network connection to a networking medium.

Further in accordance with an exemplary embodiment of the present invention the adjusting information in each of the plurality of message segments includes adjusting header information in each of the plurality of message segments.

Still further in accordance with an exemplary embodiment of the present invention the header information includes at least one of UDP header information, and IP header information.

Additionally in accordance with an exemplary embodiment of the present invention the UDP message and the MSS are received from an application layer external to the system.

Moreover in accordance with an exemplary embodiment of the present invention a vector of message segment sizes indicating sizes for each of the message segments is also received from the application layer, and the network interface layer is configured to segment the UDP message into message segments in accordance with the vector of message segment sizes.

Further in accordance with an exemplary embodiment of the present invention the length L exceeds a maximum transmission unit (MTU) length associated with the networking medium.

Still further in accordance with an exemplary embodiment of the present invention the networking medium includes an Ethernet networking medium.

Additionally in accordance with an exemplary embodiment of the present invention the plurality of message segments includes N message segments each of length MSS, and one message segment of length less than MSS.

Moreover in accordance with an exemplary embodiment of the present invention the network interface layer is included in a network interface controller (NIC).

Further in accordance with an exemplary embodiment of the present invention the physical network connection is also included in the NIC.

There is also provided in accordance with another exemplary embodiment of the present invention a method including receiving, at a network interface layer, a user datagram protocol (UDP) message for sending, the UDP message having a length L, the network interface layer segmenting the UDP message in accordance with a desired maximum network message size (MSS) into a plurality of message segments, each message segment having a size no greater than MSS, and adjusting information in each of the plurality of message segments, and the network interface layer sending the plurality of message segments via a physical network connection to a networking medium.

Further in accordance with an exemplary embodiment of the present invention the adjusting information in each of the plurality of message segments includes adjusting header information in each of the plurality of message segments.

Still further in accordance with an exemplary embodiment of the present invention the header information includes at least one of UDP header information, and IP header information.

Additionally in accordance with an exemplary embodiment of the present invention the UDP message and the MSS are received from an application layer external to the network interface layer and to the physical connection.

Moreover in accordance with an exemplary embodiment of the present invention a vector of message segment sizes indicating sizes for each of the message segments is also received from the application layer, and the network interface layer is configured to segment the UDP message into message segments in accordance with the vector of message segment sizes.

Further in accordance with an exemplary embodiment of the present invention the length L exceeds a maximum transmission unit (MTU) length associated with the networking medium.

Still further in accordance with an exemplary embodiment of the present invention the networking medium includes an Ethernet networking medium.

Additionally in accordance with an exemplary embodiment of the present invention the plurality of message segments includes N message segments of length MSS, and one message segment of length less than MSS.

Moreover in accordance with an exemplary embodiment of the present invention the network interface layer is included in a network interface controller (NIC).

Further in accordance with an exemplary embodiment of the present invention the physical network connection is also included in the NIC.

There is also provided in accordance with another exemplary embodiment of the present invention a method including receiving, from a physical network connection to a network medium, a plurality of user datagram protocol (UDP) message segments, each message segment including header information and each having a size no greater than a maximum network message size (MSS), and coalescing, at a network interface layer, the plurality of UDP message segments into a single UDP message, based at least in part on the message segment header information of each message segment, the single UDP message have a size larger than MSS.

BRIEF DESCRIPTION OF THE DRAWINGS

The present invention will be understood and appreciated more fully from the following detailed description, taken in conjunction with the drawings in which.

DETAILED DESCRIPTION OF AN EMBODIMENT

By way of introduction, note that generally Ethernet networks use a Maximum Transmission Unit (MTU) length of 1514 B. As a result, higher-level protocols may not exceed the Ethernet MTU when sending messages. The UDP protocol, as explained above, relies on the IP protocol to send messages which may be larger than MTU size. IP, as defined in RFC791 fragments packets which (in the non-limiting example of IP running on Ethernet) are larger than MTU. The IP fragments can be reassembled at the destination to produce the full message. However, dividing messages into IP fragments and reassembling them has low performance due to the lack of hardware support for dividing and reassembling such IP fragments. In particular, by way of non-limiting example, it might not make sense to perform checksum computations on an IP fragment, since checksum could not be computed until reassembly without using special techniques for such computation.

It is further noted that, in the opinion of the inventors of the present invention, sending a plurality of UDP messages, each with size no more than MTU size, is inefficient due to the context switches which typically take place between user space and kernel space, and due to the overhead from traversing the entire IP/UDP stack for each and every packet.

In accordance with exemplary embodiments of the present invention, UDP segmentation allows a user process to send a large buffer to the kernel, along with a desired maximum message size (also termed herein "message size", and abbreviated MSS) which will traverse the IP/UDP stack once. In certain exemplary embodiments of the present invention, the large message is segmented by a driver. In other exemplary embodiments, the large message is segmented by an internal component of a network interface controller (NIC). In either case, segmentation takes place according to the MSS provided by the user. Each UDP packet sent will be of MSS size, except the last packet which might be shorter (if the original message size does not divide evenly into MSS size).

As described immediately above, UDP segmentation can be provided, in exemplary embodiments of the present invention, by either hardware or software. Software UDP segmentation requires multiple memory allocations. Each packet represents a message segment, with packet headers being adjusted accordingly to reflect this. Hardware UDP segmentation may improve segmentation offload by avoiding memory allocations and/or header modifications, and is therefore believed by the inventors of the present invention to be more efficient than software UDP segmentation.

Figure 1:
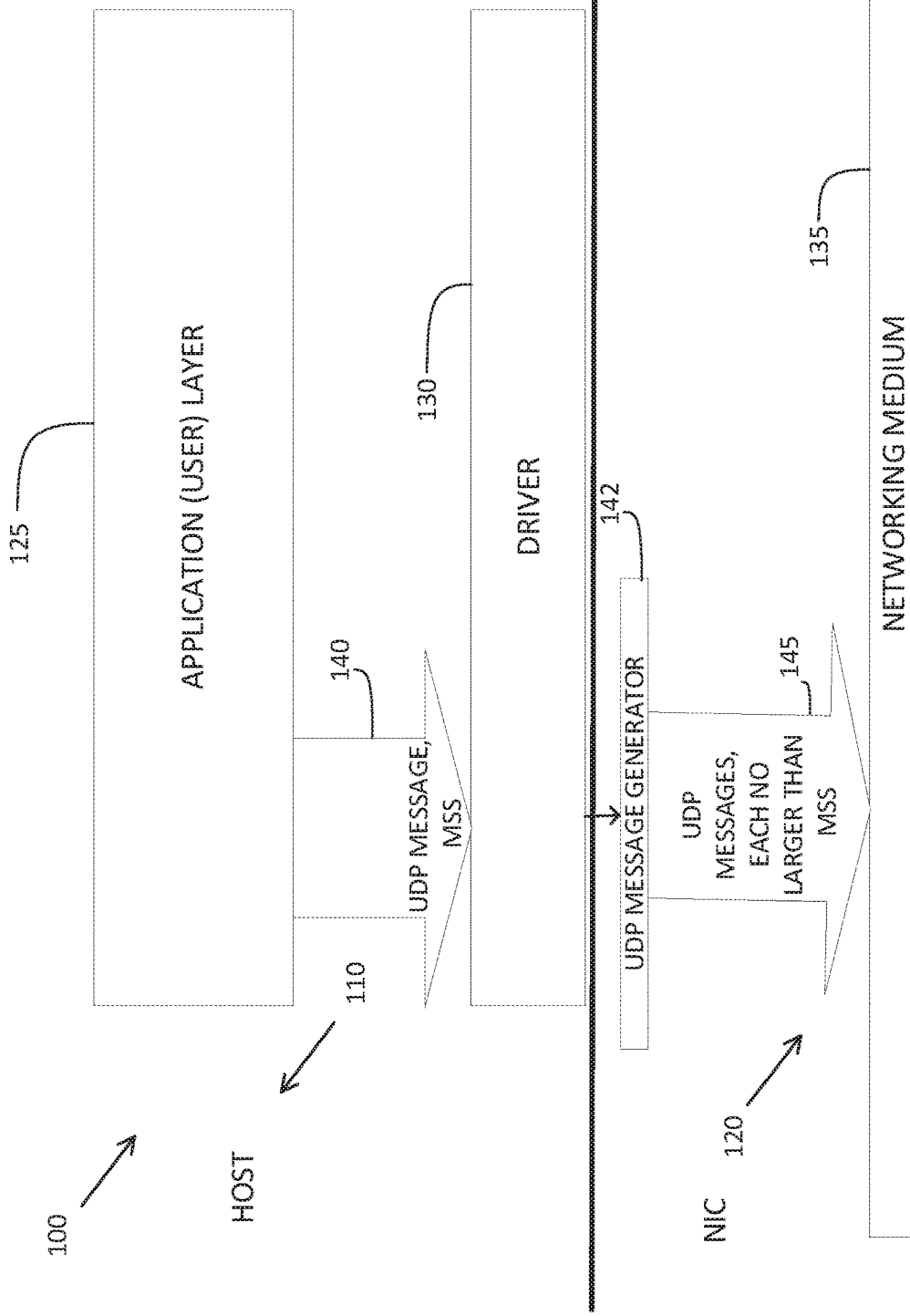
FIG. 1 is a simplified block diagram illustration of a system for message segmentation, constructed and operative in accordance with an exemplary embodiment of the present invention.

Reference is now made to FIG. 1, which is a simplified block diagram illustration of a system for message segmentation, constructed and operative in accordance with an exemplary embodiment of the present invention. The exemplary system of FIG. 1, generally designated 100, includes a host system 110, which may also termed herein a "host computer" or a "host processor". The host system may comprise any appropriate host system, as is known in the art, generally comprising a processor, memory, and one or more buses (processor, memory, and bus/es not shown for sake of simplicity of depiction) as are known in the art.

The exemplary system 100 of FIG. 1 also includes a network interface controller (NIC) 120. It will be appreciated that other networking devices providing similar functionality to a NIC may be used, and that the example of a NIC is not meant to be limiting. Appropriate NIC devices, which could be modified for use in exemplary embodiments of the present invention, are commercially available from Mellanox Technologies Ltd.

The NIC 120 comprises a UDP message generator 142, the functionality of which is described below. Persons skilled in the art will appreciate that the UDP message generator may be implemented, for example, in software, in firmware, or in hardware within the NIC 120; the choice of particular implementation may be based (for example) on considerations of implementation cost and of performance.

The host system 110 is shown running an application (user) layer 125, which may also be termed herein a "user process".

The exemplary system 100 of FIG. 1 also includes a driver 130, as is known in the art, shown as running in the host system 110. As is known in the art, drivers are used for interfacing between user processes (such as the user layer 125) and lower system levels.

The driver 130 is shown in operative communication with the NIC 120, specifically with the UDP message generator 142 in the NIC 120. The NIC 120, in turn, is associated, via a physical connection (also termed herein a "physical network connection"), as is known in the art, with a networking medium 135. The networking medium 135 may be, by way of non-limiting example, an Ethernet networking medium. Another non-limiting example is another Internet Protocol (IP) based network, such as IP over InfiniBand.

The term "medium", in its various grammatical forms, as used herein refers to a physical networking layer, such as the actual wire/s and/or cable/s providing the physical connection in an Ethernet system (Ethernet being used by way of non-limiting example). The term "wire" may be used herein interchangeably with the term "medium".

The exemplary system 100 of FIG. 1 also includes a data connection 140 for communicating, within the host system 100, between the application layer 125 and the driver 130; and a NIC communication path 145 for communicating between the NIC 120 (specifically, between the UDP message generator 142 in the NIC 120) and the networking medium 135.

It is appreciated that a sub-combination of the exemplary system of FIG. 1, not including the host system 110, may comprise an alternative exemplary embodiment of the present invention; as may a sub-combination including neither the host system 110 nor the networking medium 135.

An exemplary mode of operation of the exemplary system 100 of FIG. 1 is now briefly described.

The application layer 125 has a "large" UDP message to be sent; "large" in this context indicates that the size of the UDP message is greater than a desired maximum message size (MSS), as described above. The MSS might be equal to the MTU, as described above, in the non-limiting case where the networking medium 135 is an Ethernet networking medium; in general, it will be appreciated that the MSS will be smaller than or equal to the largest message size which may be conveniently transmitted in a single message or packet on the networking medium.

The application layer 125 passes the UDP message and the value of MSS via the data connection 140 to the driver 130. At the driver 130 (by way of non-limiting example; see FIGS. 3 and 4 and the description thereof, below) the UDP message is broken up into a plurality of message segments, each message segment having size no more than MSS. In exemplary embodiments of the present invention, the UDP message is broken up into a plurality of message segments, each message segment having size no more than MSS, by the UDP message generator 142.

Continuing with the case where the UDP message is broken up into a plurality of message segments by the UDP message generator 142, the driver 130 passes information, generally comprising the UDP message and the value of MSS which was received at the driver via the data connection 140, on to the UDP message generator 142 in the NIC 120. The UDP message generator 142 then breaks up the UDP message into a plurality of message segments as described below.

Figure 2:
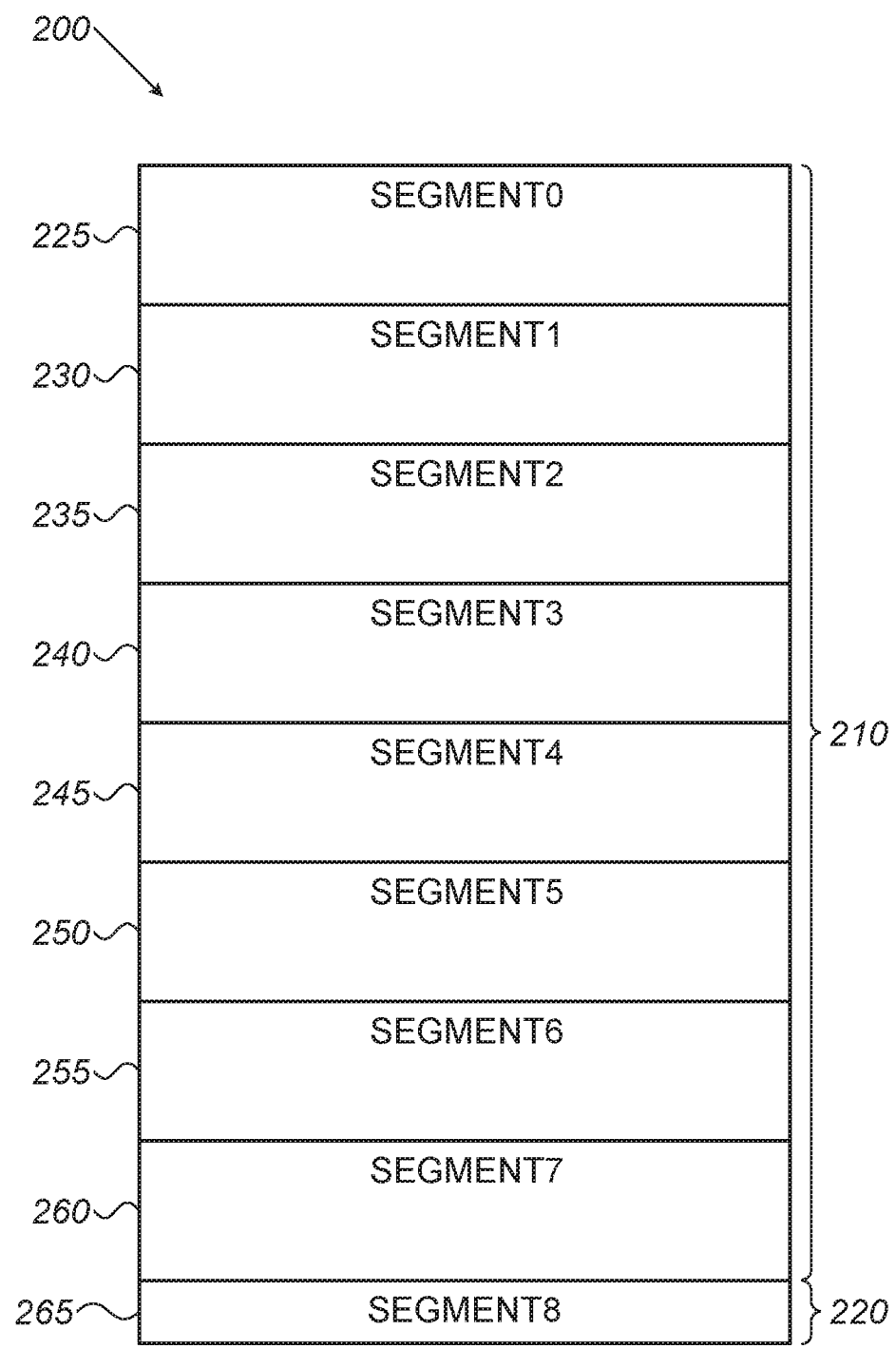
FIG. 2 is a simplified block diagram illustration of exemplary message segmentation, useful for understanding the system of FIG. 1.

Reference is now additionally made to FIG. 2, which is a simplified block diagram illustration of exemplary message segmentation, useful for understanding the system of FIG. 1. The illustration of message segmentation in FIG. 2 is one particular non-limiting example, provided to better understand operation of the system of FIG. 1.

FIG. 2 depicts a message, generally designated 200, such as a UDP message. When broken up into a plurality of message segments each of size no greater than MSS, as described above, the message 200 (in a general case where the message 200 can not be divided equally into messages of size MSS) is shown as divided into a plurality of message segments of equal size 210 and a "remainder" segment 220.

The plurality of message segments of equal size 210 in FIG. 2 comprises the following message segments (by way of one particular non-limiting example, it being appreciated that more or fewer than the plurality of message segments of equal size 210 may be produced when dividing an actual message 200):

segment0 225;
segment1 230;
segment2 235;
segment3 240;
segment4 245;
segment5 250;
segment6 255.

In addition, a final message segment7 of equal size 260, and a remaining message segment8 265 of smaller size than each of the message segments of equal size is depicted; the remaining message segment8 265 is also designated 220. It is appreciated that, in a case where message 200 is an exact multiple of the message size MSS, the remaining message segment8 265, 220 will not be present.

Generally, the "large" UDP message includes a plurality of headers, including (when sending over an IP network) at least one IP header and one UDP header, it being appreciated that more headers may be used when the "large" UDP message is encapsulated (as is known in the art). When the "large" UDP message is segmented into message segments as described above, the headers are updated in each message segment so that the message segments can operate properly within the IP network.

In particular, at the IP level, the IP identification field in the IP header is incremented for each message segment sent to the wire, and the IP total length field of each message segment corresponds to the length of that message segment (and not, for example, to the length of the "large" UDP message). In each message segment, the IP checksum field relates to the IP and UDP headers of that message segment as sent to the wire.

At the UDP level, the UDP length field corresponds to the length of that message segment on the wire, while the UDP checksum field covers only the payload of that UDP message segment on the wire.

The NIC 120 of FIG. 1, or other appropriate networking device, updates the above-mentioned fields based on MSS and on the initial values of those fields in the "large" UDP message. (It is appreciated that an implementation in which the update operation is carried out within a driver, such as the driver 130 of FIG. 1, is also possible. In other words, the IP.id field of the first message segment sent to the wire corresponds to the IP.id field of the "large" UDP message, the IP.id of must be increment by one for each subsequent message segment. The length fields in the IP and UDP headers of each message segment are updated according to the length of each message segment sent on the wire. The checksum fields in the IP and UDP headers for each message segment are updated according to the data in each message segment on the wire.

When message segments as described herein are received, the message segments are coalesced back into a single UDP message (corresponding to the original "large" UDP message. It is known for some modern network interface cards to employ a technique called Large Receive Offload (LRO) to coalesce multiple TCP packets which pertain to a single flow into a single large packet comprising a combined byte stream. In LRO coalescing is performed when the packets to be coalesced satisfy one or more specific conditions (such as, for example, that the packets have no special flags set, that the packets are received in order, a size limit requiring that coalescing takes place has been reached, or a certain time has passed since the first packet has been received.

Modern NICs employ Large Receive Offload (LRO) to coalesce multiple TCP packets pertaining to the same flow into a single large packet that contains the combined byte stream. Coalescing is performed as long as the coalesced packets satisfy a specific condition (e.g., no special flags, packets are received in order), a size limit has been reached, or a certain time has passed since the first packet has been received.

In contrast to LRO, when UDP message segments are received, when the multiple UDP message segments pertain to the same flow those multiple UDP message segments are coalesced; however, very differently from TCP (in which the coalesced/aggregated data is a byte stream), in UDP the coalesced/aggregated data is not a byte stream; for this reason, boundaries between aggregated UDP messages are reported to an application (user).

In certain exemplary embodiments of the present invention, the boundaries can be reported by coalescing only UPD datagrams of similar size, and optionally reporting that size to the application while delivering the aggregated datagram in this way, the application can infer the boundaries between messages. This scheme can be extended to cases in which the last packet has a different size, which is less than that of the other packets.

In exemplary embodiments of the present invention, both segmentation and de-segmentation, as described herein, may be extended to support any mix of message sizes by complementing the aggregate message segment data with a vector (or other appropriate table) of message segment sizes, the sum of the message segment sizes being equal to the size of the aggregated data (the size of the "large" UDP message"). Thus the usability of UDP segmentation offload may be extended to "large" UDP messages, and to message segments, of arbitrary size.

In exemplary embodiments:

In the segmentation case, the application provides the segment sizes. The HW then fragments the large message accordingly.

In the de-segmentation case, networking hardware (such as the NIC 120 of FIG. 1) provides the individual sizes of each of the aggregated packets together with the resulting "large" UDP message. The application may, from this information, deduce the datagram boundaries.

Figure 3:
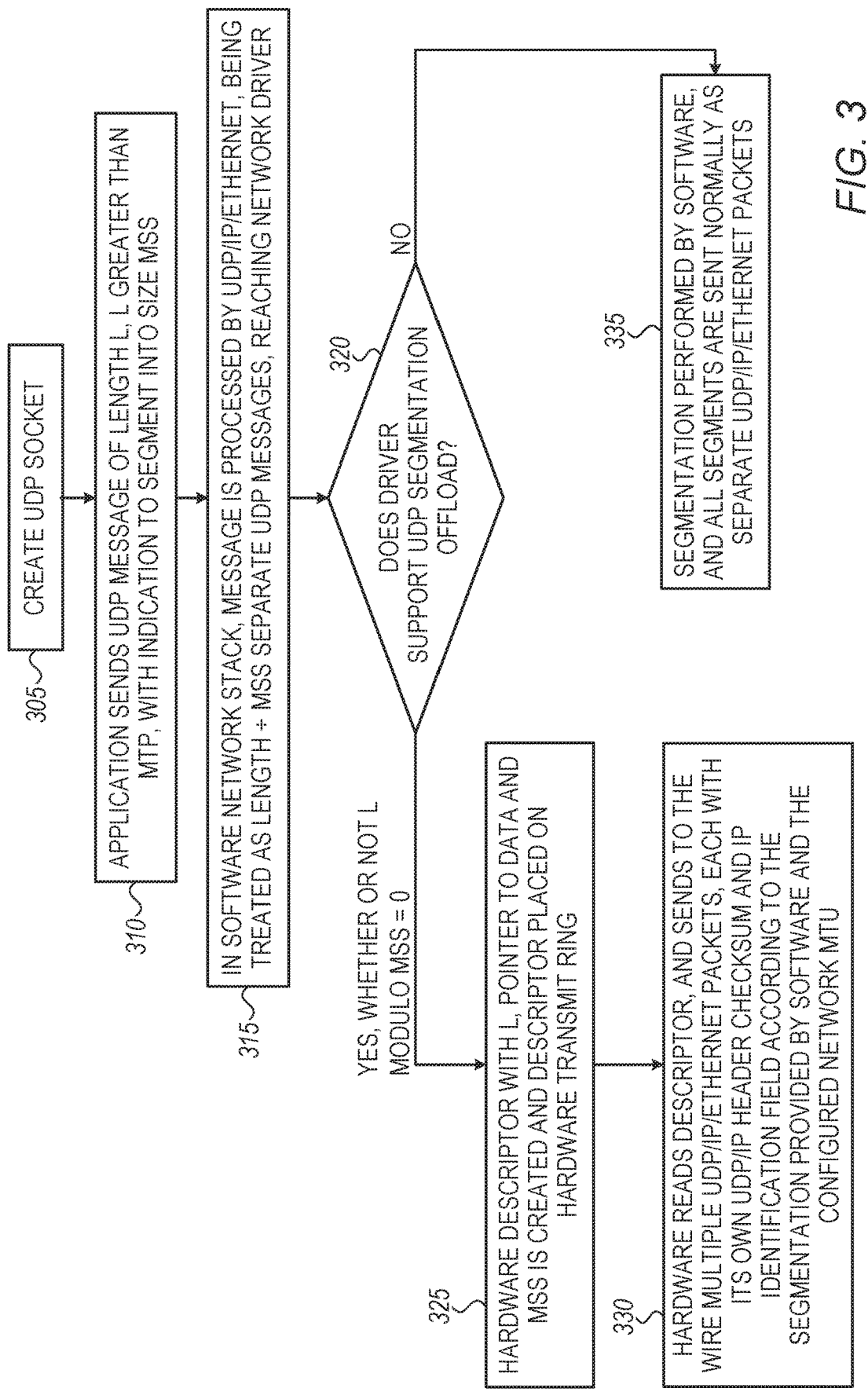
FIGS. 3 and 4 are simplified flowchart illustrations of exemplary methods of operation of the system of FIG. 1.
Figure 4:
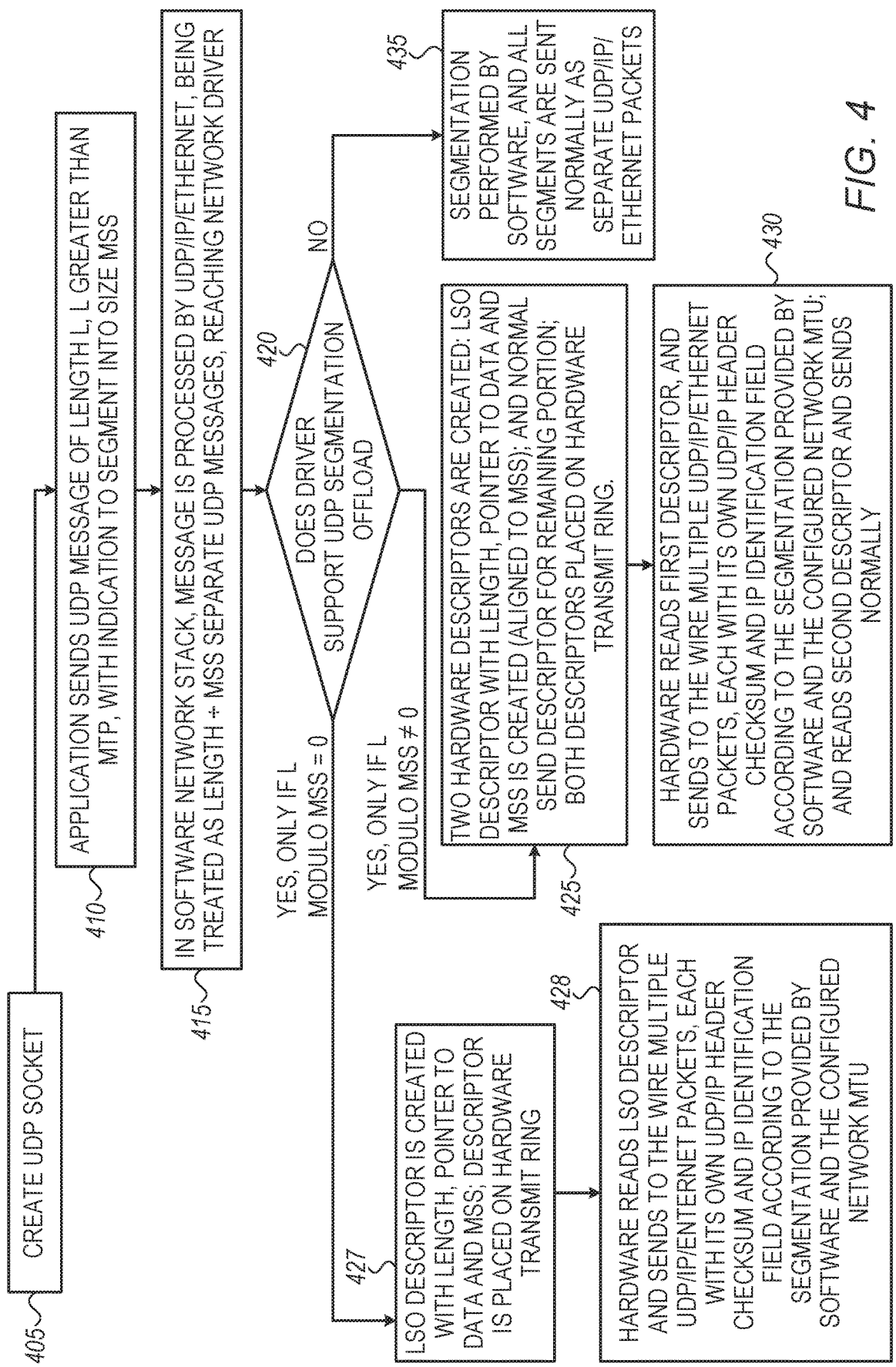

Reference is now made to FIGS. 3 and 4, which are simplified flowchart illustrations of exemplary methods of operation of the system of FIG. 1.

FIG. 3, which will be described first, depicts a case in which a driver (such as the driver 130 of FIG. 1), if able to handle segmentation of messages, may be able (as further described below) to handle segmentation of messages whether or not such messages are of a size which is an integer multiple of MSS (whether or not the message size L modulo MSS=0).

FIG. 4 depicts a slightly more complex case, in which a driver (such as the driver 130 of FIG. 1), if able to handle segmentation of messages, may be able (as further described below) to handle segmentation of messages in a manner similar to that of the method of FIG. 3 only if L modulo MSS=0, so that handling of messages when L modulo MSS≠0 is more complex than in the method of FIG. 3.

The method of FIG. 3 includes the following steps:

A UDP socket is created (step 305), generally by a standard call from the application, as is known in the art.

The application sends to the driver a UDP message of length L (L being greater than the MTP), together with an indication that the message should be segmented into segments of size no greater than MSS (step 310).

Within network software in the software network stack, the message is processed (by UDP and IP components of the software network stack) as a single message; while being broken up generally only at the lowest level (such as the Ethernet level) into L÷MSS separate UDP messages (with a possible additional smaller message, as described herein).

If the driver itself does not support offload of UDP message segmentation to the driver (step 320), then segmentation of the UDP message is performed by software, and all segments of the UDP message are sent as in a "normal" case as separate UDP/IP/Ethernet packets (step 335).

If on the other hand (in step 320) it is determined that the driver itself does support offload of UDP message segmentation to the driver, processing continues at step 325; again, as described above, in the case depicted in FIG. 3, the driver supports UDP message segmentation whether or not L modulo MSS=0.

The driver creates a hardware descriptor including the length L, MSS, and a pointer to the data and that descriptor is sent for hardware transmission; this is also termed placing that descriptor on the hardware transmit ring (step 325). The hardware transmit ring, in exemplary embodiments of the present invention, comprises a buffer accessible via direct memory access (DMA), which buffer includes descriptors of operations that are executed by the hardware transmit engine. For example, in ConnectX devices (commercially available from Mellanox Technologies Ltd.) each work queue entry (WQE) on a WQ (which comprises a hardware transmit ring) represents an operation that is executed by the hardware.

The hardware reads the descriptor created in step 325 and sends to the networking medium (also known as the "wire") multiple UDP/IP/Ethernet packets, each packet including its own UDP/IP header checksum and IP identification field in accordance with the segmentation provided by software and the configured network MTU (step 330). Note that the hardware itself handles the case where L module MSS≠0, by sending a remaining segment as described above.

In exemplary embodiments, segmentation as described herein comprises splitting the message (also termed a payload) and adjusting the following header fields: IP.ID, IP.length, UDP.length, and any additional encapsulation fields as required.

The method of FIG. 4 includes the following steps:

Steps 405, 410, and 415 may be identical to steps 305, 310, and 315, respectively, described above with reference to FIG. 3.

A 3-way test is made at step 420:

If the driver itself does not support offload of UDP message segmentation to the driver, then segmentation of the UDP message is performed by software, and all segments of the UDP message are sent as in a "normal" case as separate UDP/IP/Ethernet packets (step 435).

If the driver itself does support offload of UDP message segmentation to the driver, and L modulo MSS=0, then execution continues at steps 427 and 428, described below.

If the driver itself does support offload of UDP message segmentation to the driver, and L modulo MSS≠0, then execution continues at steps 425 and 430.

In step 427, a descriptor termed herein an LSO (large segmentation offload) descriptor is created. The LSO descriptor includes the length L, MSS, and a pointer to the data and that descriptor is sent for hardware transmission; this is also termed placing that descriptor on the hardware transmit ring. In step 428, the hardware reads the LSO descriptor and, based thereon, sends multiple UDP/IP/Ethernet packets to the wire, each such packet having its own UDP/IP header checksum and IP identification field according to the segmentation provided by software and according to the configured MTU.

In step 425, two hardware descriptors are created: the first is an LSO descriptor as described with reference to step 427; and the second is a normal send descriptor for the remaining portion (also termed herein a "remaining segment"). In step 430, the hardware reads and process the LSO descriptor, as described with reference to step 428; and also reads the second descriptor and carries out a "normal" send operation.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A system comprising:
a network interface layer; and
a physical network connection configured to connect with a networking medium, wherein:
the network interface layer is configured to:
A) receive a user datagram protocol (UDP) message for sending, the UDP message having a length L, and a desired maximum network message size (MSS);
B) segment the UDP message in accordance with the MSS into a plurality of message segments, each message segment having a size no greater than MSS, and adjust UDP header information in each of the plurality of message segments; and
C) send the plurality of message segments via the physical network connection to a networking medium,
wherein the UDP message and the MSS are received from an application layer external to the system.

2. The system according to claim 1 and wherein a vector of message segment sizes indicating sizes for each of the message segments is also received from the application layer, and the network interface layer is configured to segment the UDP message into message segments in accordance with the vector of message segment sizes.

3. The system according to claim 1 and wherein the length L exceeds a maximum transmission unit (MTU) length associated with the networking medium.

4. The system according to claim 3 and wherein the networking medium comprises an Ethernet networking medium.

5. The system according to claim 1 and wherein the plurality of message segments comprises: N message segments each of length MSS; and one message segment of length less than MSS.

6. The system according to claim 1 and wherein the network interface layer is comprised in a network interface controller (NIC).

7. The system according to claim 6 and wherein the physical network connection is also comprised in the NIC.

8. A method comprising:
receiving, at a network interface layer, a user datagram protocol (UDP) message for sending, the UDP message having a length L;
the network interface layer segmenting the UDP message in accordance with a desired maximum network message size (MSS) into a plurality of message segments, each message segment having a size no greater than MSS, and adjusting UDP header information in each of the plurality of message segments; and
the network interface layer sending the plurality of message segments via a physical network connection to a networking medium,
wherein the UDP message and the MSS are received from an application layer external to the network interface layer and to the physical connection.

9. The method according to claim 8 wherein a vector of message segment sizes indicating sizes for each of the message segments is also received from the application layer, and the network interface layer is configured to segment the UDP message into message segments in accordance with the vector of message segment sizes.

10. The method according to claim 8 and wherein the length L exceeds a maximum transmission unit (MTU) length associated with the networking medium.

11. The method according to claim 10 and wherein the networking medium comprises an Ethernet networking medium.

12. The method according to claim 8 and wherein the plurality of message segments comprises: N message segments of length MSS; and one message segment of length less than MSS.

13. The method according to claim 8 and wherein the network interface layer is comprised in a network interface controller (NIC).

14. The method according to claim 13 and wherein the physical network connection is also comprised in the NIC.

* * * * *